(12) United States Patent
Fukami et al.

(10) Patent No.: US 7,894,007 B2
(45) Date of Patent: Feb. 22, 2011

(54) LIQUID CRYSTAL DISPLAY DEVICE

(75) Inventors: Tetsuo Fukami, Ishikawa-gun (JP); Yukio Tanaka, Kanazawa (JP); Masaki Miyatake, Konosu (JP); Hiroshi Azuma, Nomi (JP); Kenji Nakao, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 357 days.

(21) Appl. No.: 12/114,208

(22) Filed: May 2, 2008

(65) Prior Publication Data

US 2008/0278644 A1 Nov. 13, 2008

(30) Foreign Application Priority Data

May 8, 2007 (JP) ............................. 2007-123721
Jun. 22, 2007 (JP) ............................. 2007-165551

(51) Int. Cl.
*G09G 3/36* (2006.01)
*G02F 1/141* (2006.01)

(52) U.S. Cl. ............................................. 349/37; 345/96
(58) Field of Classification Search ................... 349/37; 345/87, 96, 103
See application file for complete search history.

(56) References Cited

U.S. PATENT DOCUMENTS 5,285,301 A * 2/1994 Shirahashi et al. .......... 349/143
2008/0074568 A1 3/2008 Tanaka et al.

FOREIGN PATENT DOCUMENTS

JP 9-54325 2/1997

OTHER PUBLICATIONS

U.S. Appl. No. 12/771,191, filed Apr. 30, 2010, Tanaka et al.

* cited by examiner

*Primary Examiner*—David Nelms
*Assistant Examiner*—David Y Chung
(74) *Attorney, Agent, or Firm*—Oblon, Spivak, McClelland, Maier & Neustadt, L.L.P.

(57) ABSTRACT

A liquid crystal display device includes a liquid crystal display panel having a display section which is composed of a plurality of display pixels, a driving unit which drives the display pixels, and a control unit which controls the driving unit. A first substrate includes pixel electrodes which are disposed in association with the plurality of display pixels. A second substrate includes a counter-electrode which is opposed to the plurality of pixel electrodes. A pair of alignment films are disposed on the plurality of pixel electrodes and the counter-electrode, and control an alignment state of liquid crystal molecules, which are included in the liquid crystal layer, by rubbing treatment. Dummy display pixels are disposed on a terminal end side of the display section in a rubbing direction. A driving unit includes circuit for cyclically applying a reverse transition prevention signal to the dummy display pixels.

7 Claims, 13 Drawing Sheets

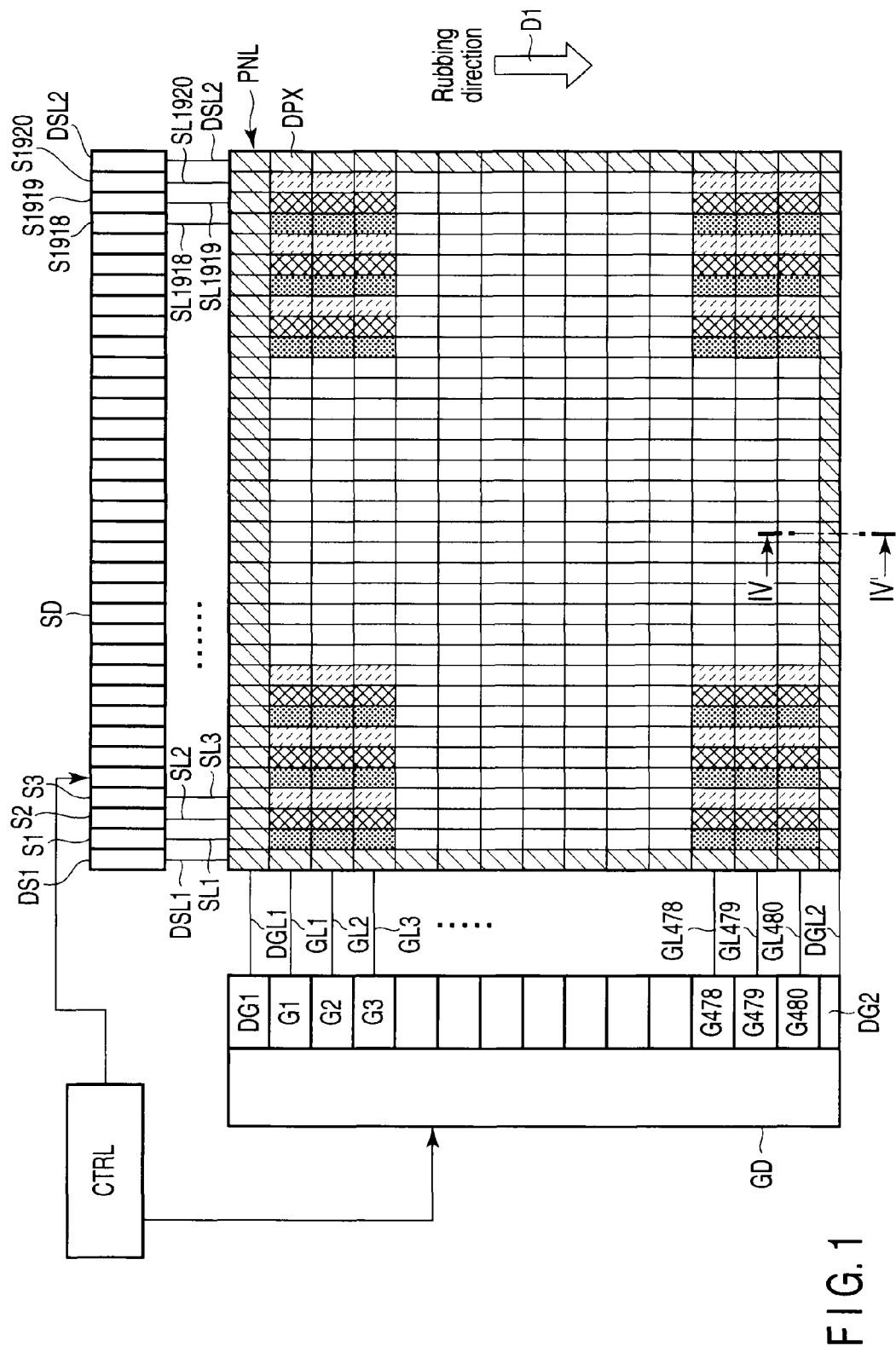
F I G. 1

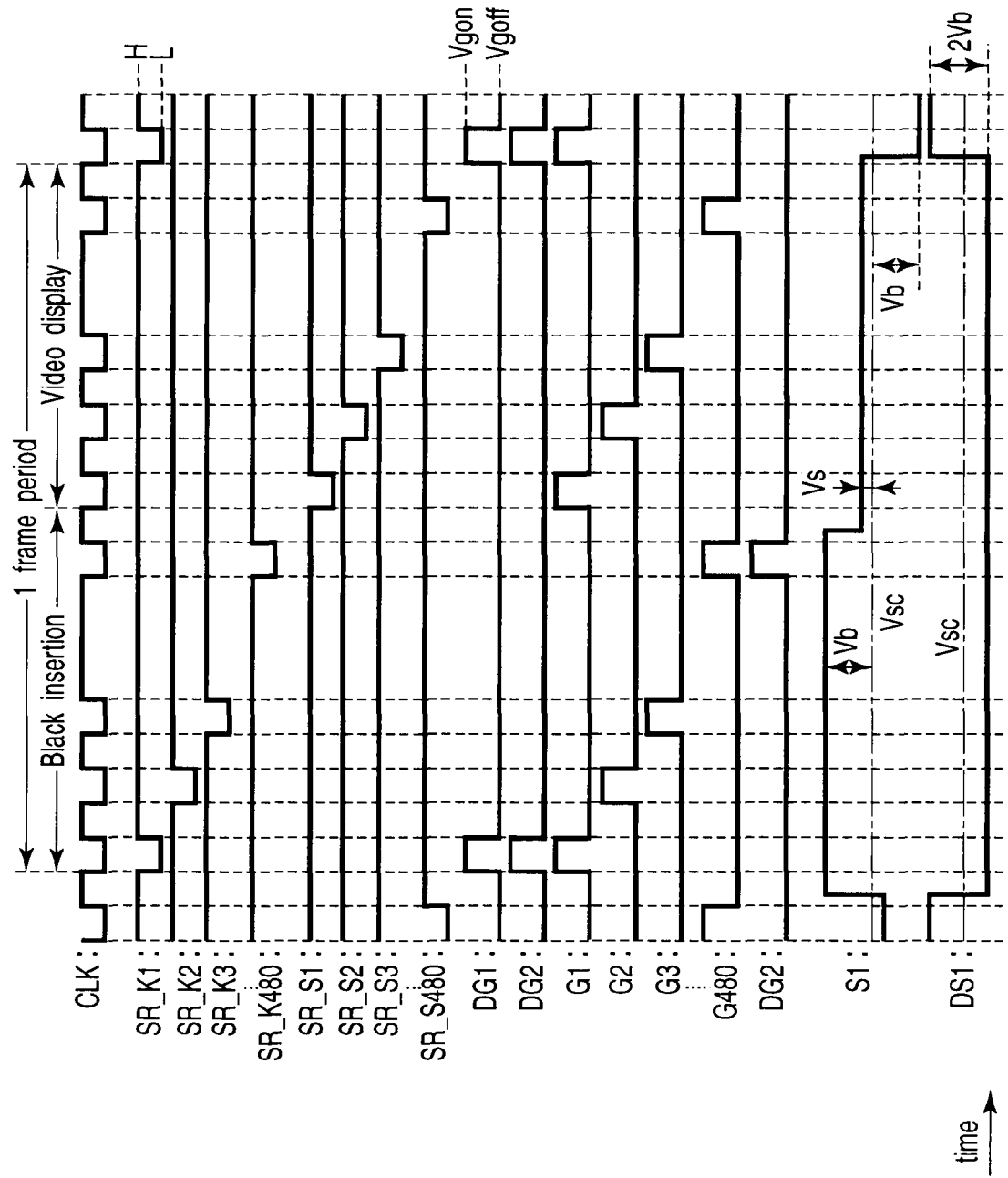
F I G. 6

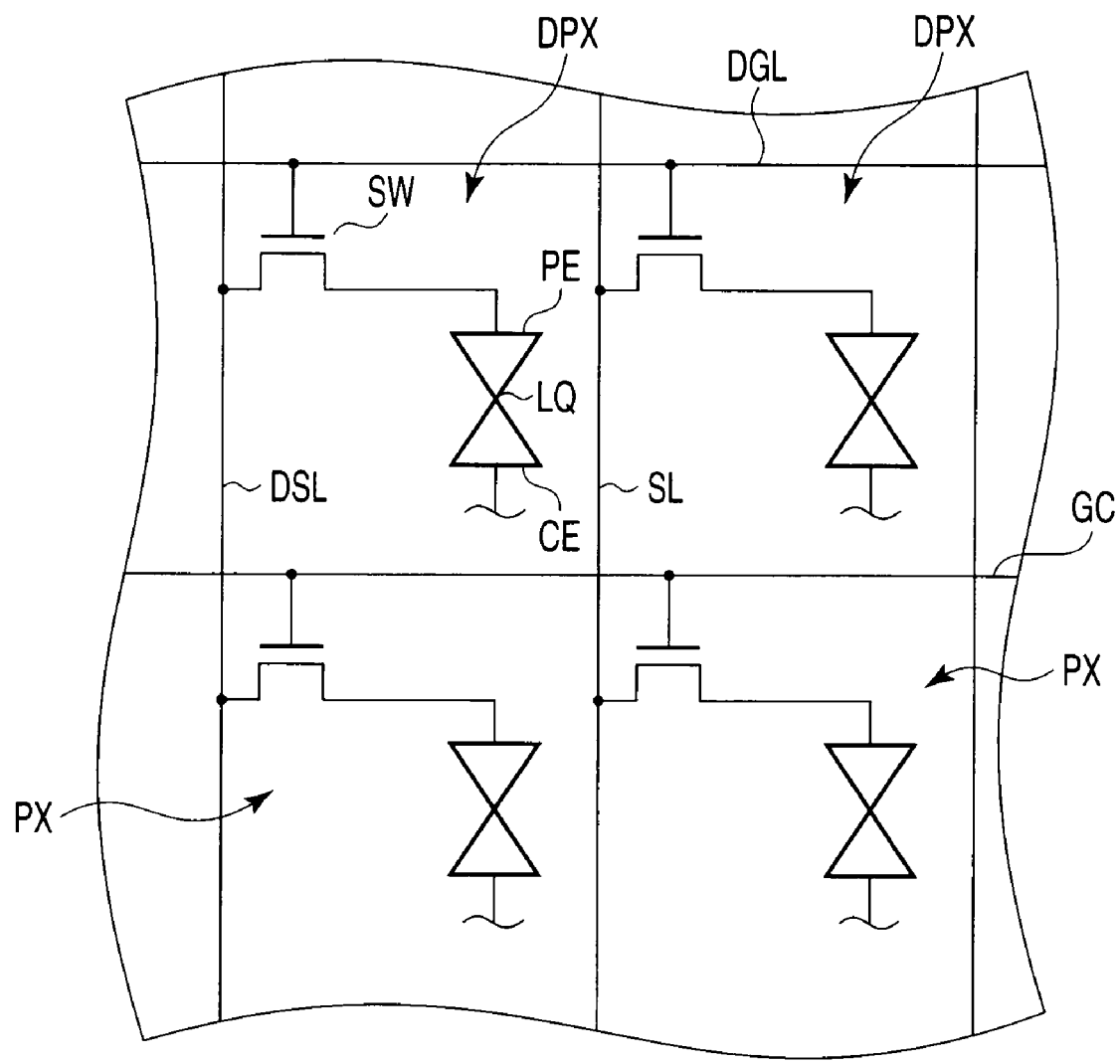
F I G. 9

LIQUID CRYSTAL DISPLAY DEVICE

CROSS-REFERENCE TO RELATED APPLICATIONS

This application is based upon and claims the benefit of priority from prior Japanese Patent Applications No. 2007-123721, filed May 8, 2007; and No. 2007-165551, filed Jun. 22, 2007, the entire contents of both of which are incorporated herein by reference.

BACKGROUND OF THE INVENTION

1. Field of the Invention

The present invention relates generally to a liquid crystal display device and more particularly to an active matrix liquid crystal display device.

2. Description of the Related Art

In general, a liquid crystal display device includes a liquid crystal display panel having a display section on which an image is displayed. The liquid crystal display panel includes a pair of mutually opposed substrates. A liquid crystal layer is held between the pair of substrates.

One of the substrates includes a plurality of pixel electrodes which are arrayed substantially in a matrix. The other substrate includes a counter-electrode which is opposed to the plural pixel electrodes. A pair of alignment films for aligning a liquid crystal are disposed on the plural pixel electrodes and the counter-electrode. The alignment state of the liquid crystal is obtained by controlling the alignment of liquid crystal molecules on the pair of alignment films. A rubbing method, for instance, is known as a method of controlling the alignment of liquid crystal molecules. In the rubbing method, the alignment film is rubbed by a rubbing cloth. Thus, an average direction of major axes of liquid crystal molecules is controlled by the rubbing treatment.

In recent years, attention has been paid to a so-called black insertion driving method in which black signal write and video signal write are repeated in one frame period, thereby to enhance the video quality in the liquid crystal display panel and to improve the response speed. In the operation of the liquid crystal display panel to which this driving method is applied, the alignment state of liquid crystal molecules is cyclically varied by cyclical application of a black signal and a video signal. Thereby, a flow occurs in the liquid crystal layer substantially in the same direction as the rubbing direction of the alignment film.

In addition, from the standpoint of high responsivity and a wide viewing angle, attention has been paid to an OCB (Optically-Compensated-Bent) mode as a display scheme of a liquid crystal display device. In the OCB mode liquid crystal display device, such a driving method is applied that display is effected on the basis of a reverse transition prevention signal and a video signal in one frame, thereby to improve the video quality. If this driving method is applied, a flow occurs due to a variation in alignment of liquid crystal molecules in the liquid crystal layer substantially in the same direction as the rubbing direction of the alignment film.

There is a case in which ions are taken in during the fabrication process of the liquid crystal display device, or the material itself of, e.g. glass substrates, which constitute the liquid crystal display device, contain ions. Such ions move in the liquid crystal layer in the display section due to the flow occurring in the liquid crystal layer. On the other hand, no flow occurs in the liquid crystal layer in the peripheral section. As a result, ions may agglomerate in the vicinity of a boundary between the display section and the peripheral section. In the region of the liquid crystal layer where ions agglomerate, the transmittance versus application voltage characteristics vary, and such a variation, in some cases, may be recognized as display non-uniformity.

In the prior art, there has been proposed an invention of an OCB mode liquid crystal display device wherein impurity ions are collected on ion trap electrodes provided at the peripheral section surrounding the display section, thereby to solve the problem that spacers, such as beads, or impurity ions move by the flow occurring due to the variation in alignment of liquid crystal molecules, and to prevent occurrence of a display defect such as display non-uniformity (see Jpn. Pat. Appln. KOKAI Publication No. H9-54325).

In the above-described prior art invention, however, no consideration is given to the rubbing direction of alignment films, and it is difficult to effectively suppress a display defect due to ions which move in the rubbing direction. In addition, in the peripheral section, if a fixed DC voltage, with which the liquid crystal molecules are bend-aligned, is applied to the liquid crystal layer, the viscosity of the liquid crystal layer increases. Hence, diffusion of the liquid crystal layer does not easily occur in the peripheral section, and impurity ions, which move in one direction due to the flow of the liquid crystal layer, do not move to the peripheral section and may agglomerate in the vicinity of the boundary between the display section and the peripheral section.

In particular, in a liquid crystal display panel with a small picture-frame region surrounding the display section, the picture-frame region is small, compared to the amount of ions in the entire liquid crystal display panel, thus leading to a case in which ions spreads into the display region due to long-time driving.

As has been described above, in a region where agglomeration of ions occurs, such as a region on a terminal end side in the rubbing direction, the transmittance versus application voltage characteristics of the liquid crystal layer vary due to ions. In particular, the transmittance versus application voltage characteristics of the liquid crystal layer vary in the display section, and such a variation, in some cases, may be recognized as display non-uniformity.

BRIEF SUMMARY OF THE INVENTION

The present invention has been made in consideration of the above-described problems, and the object of the invention is to provide a liquid crystal display device which can suppress a display defect, such as display non-uniformity, due to non-uniformity of ions in a liquid crystal layer, and has high display quality and high reliability.

According to a first aspect of the present invention, there is provided a liquid crystal display device comprising: a liquid crystal display panel including a first substrate and a second substrate which are opposed to each other, a liquid crystal layer which is held between the first substrate and the second substrate, and a display section which is composed of a plurality of display pixels arrayed in a matrix; a driving unit which drives the display pixels; and a control unit which controls the driving unit, wherein the first substrate includes pixel electrodes which are disposed in association with the plurality of display pixels, the second substrate includes a counter-electrode which is opposed to the plurality of pixel electrodes, a pair of alignment films are disposed on the plurality of pixel electrodes and the counter-electrode and control an alignment state of liquid crystal molecules, which are included in the liquid crystal layer, by rubbing treatment, dummy display pixels are disposed at least on a terminal end side of the display section in a rubbing direction of the alignment films, and the driving unit includes means for cyclically applying a video signal and a reverse transition prevention signal to the display pixels, and cyclically applying the reverse transition prevention signal to the dummy display pixels.

According to a second aspect of the present invention, there is provided a liquid crystal display device comprising a liquid crystal layer which is held between a first substrate and a second substrate, a display section which is composed of a plurality of display pixels arrayed in a matrix, and a peripheral section which surrounds the display section, wherein the first substrate includes pixel electrodes which are disposed in association with the plurality of display pixels, the second substrate includes a counter-electrode which is opposed to the plurality of pixel electrodes, the liquid crystal display device includes a pair of alignment films which are disposed on the plurality of pixel electrodes and the counter-electrode and control an alignment state of liquid crystal molecules included in the liquid crystal layer by rubbing treatment, and dummy display pixels, to which a fixed voltage is applied when the display device is driven, are disposed at least on a terminal end side of the peripheral section in a rubbing direction of the alignment films.

The present invention can provide a liquid crystal display device which can suppress a display defect, such as display non-uniformity, due to non-uniformity of ions in a liquid crystal layer, and has high display quality and high reliability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 schematically shows an example of the structure of a liquid crystal display device according to an embodiment of the present invention;

FIG. 6 is a timing chart for explaining an example of a driving method of the liquid crystal display device shown in FIG. 5;

FIG. 9 schematically shows an example of the structure of display pixels of the liquid crystal display panel shown in FIG. 1;

DETAILED DESCRIPTION OF THE INVENTION

A liquid crystal display device according to a first embodiment of the present invention will now be described with reference to the accompanying drawings. The liquid crystal display device according to the present embodiment is, for instance, an OCB mode liquid crystal display device which includes a liquid crystal display panel PNL. The liquid crystal display panel PNL includes an array substrate (not shown), a counter-substrate (not shown), and a liquid crystal layer LQ which is held between the array substrate and the counter-substrate.

As shown in FIG. 1, the liquid crystal display panel PNL includes a display section DYP which is composed of display pixels PX arrayed in a matrix, and dummy display pixels DPX which are so arranged as to surround the display section DYP. In a color-display-type liquid crystal display device, various kinds of display pixels, such as a red display pixel, a green display pixel and a blue display pixel, are disposed as the display pixels PX in the display section DYP.

The liquid crystal display device further includes a driving unit which drives the display pixels PX and dummy display pixels DPX, and a controller CTRL which controls the driving unit. The driving unit includes a gate driver GD and a source driver SD.

In the display section DYP, scanning lines GL extending along rows in which display pixels PX are arranged and signal lines SL extending along columns in which display pixels PX are arranged are disposed on the array substrate of the liquid crystal display panel PNL.

The liquid crystal display device according to the present embodiment is, for example, a VGA (video graphics array) (640×3 pixels in the horizontal direction, 480 pixels in the vertical direction) display device, and 480 scanning lines (GL1 to GL480) and 1920 signal lines (SL1 to SL1920) are disposed on the display section DYP.

Figure 2:
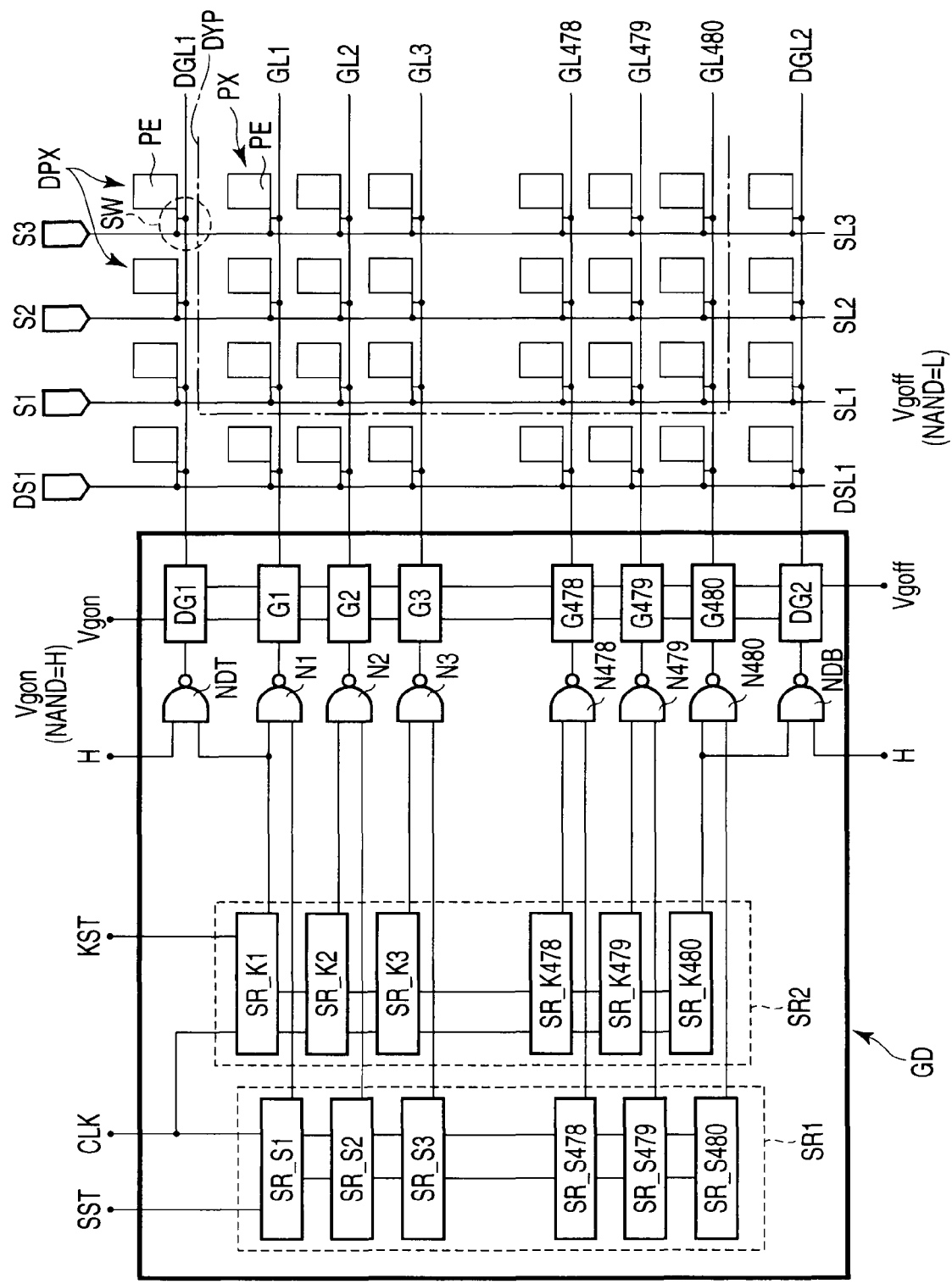
FIG. 2 schematically shows an example of the structure of a liquid crystal display panel and a driving unit of the liquid crystal display device shown in FIG. 1.

As shown in FIG. 1 and FIG. 2, dummy scanning lines DGL extending substantially in parallel to the scanning lines GL and dummy signal lines DSL extending substantially in parallel to the signal lines SL are disposed on parts where the dummy display pixels DPX are disposed.

Specifically, in the liquid crystal display device according to the present embodiment, a row of dummy display pixels DPX is disposed on each of an upper side and a lower side of the display section, and a column of dummy display pixels DPX is disposed on each of a left side and a right side of the display section. Accordingly, a dummy scanning line DGL1 extending substantially in parallel to the scanning lines GL is disposed on the upper side of the display section DYP, and a dummy scanning line DGL2 extending substantially in parallel to the scanning lines GL is disposed on the lower side of the display section DYP. A dummy signal line DSL1 extending substantially in parallel to the signal lines SL is disposed on the left side of the display section DYP, and a dummy signal line DSL2 extending substantially in parallel to the signal lines SL is disposed on the right side of the display section DYP.

As shown in FIG. 2, pixel switches SW are disposed near intersections between the scanning lines GL or dummy scanning lines DGL and the signal lines SL or dummy signal lines DSL. Each of the pixel switches SW includes, for example, a thin-film transistor (TFT) as a switching element.

A gate electrode of the pixel switch SW is electrically connected to the associated scanning line GL or dummy scanning line DGL. A source electrode of the pixel switch SW is electrically connected to the associated signal line SL or dummy signal line DSL. A drain electrode of the pixel switch SW is electrically connected to a pixel electrode PE which is disposed in each of the display pixels PX or dummy display pixels DPX.

The scanning lines GL and dummy scanning lines DGL1 and DGL2 are electrically connected to the gate driver GD. The signal lines SL and dummy signal lines DSL1 and DSL2 are electrically connected to the source driver SD.

The gate driver GD and source driver SD are controlled by the controller CTRL, and cyclically apply a video signal and a reverse transition prevention signal to the display pixels PX and cyclically apply a reverse transition prevention signal to the dummy display pixels DPX. In the liquid crystal display device according to the present embodiment, a voltage Vb corresponding to black display is applied as the reverse transition prevention signal to the display pixels PX and dummy display pixels DPX.

As shown in FIG. 2, the gate driver GD includes video signal shift registers (shift registers for video signals) SR_S (SR_S1 to SR_S480), black insertion shift registers (shift registers for black insertion) SR_K (SR_K1 to SR_K480), first NAND circuits N (N1 to N480) and second NAND circuits NDT and NDB.

The video signal shift registers SR_S output to the first NAND circuits N a high signal H or a low signal L which is synchronized with a clock signal CLK from the controller CTRL, in accordance with a video signal start pulse (a start pulse for a video signal) SST which is supplied from the controller CTRL or an output from a preceding-stage video signal shift register.

The black insertion shift registers SR_K output to the first NAND circuits N and second NAND circuits NDT and NDB a high signal H or a low signal L which is synchronized with the clock signal CLK from the controller CTRL, in accordance with a black insertion start pulse (a start pulse for black insertion) KST which is supplied from the controller CTRL or an output from a preceding-stage black insertion shift register.

Specifically, as shown in FIG. 2, an output signal from the black insertion shift register SR_K1 is input to the first NAND circuit N1 and second NAND circuit NDT. An output signal from the black insertion shift register SR_K480 is input to the first NAND circuit N480 and second NAND circuit NDB.

The first NAND circuit N outputs to the first gate circuit G (G1 to G480) a NAND value between the output signals from the video signal shift register SR_S and black insertion shift register SR_K and a high signal H. The second NAND circuit NDT, NDB outputs to the second gate circuit DG1, DG2 a NAND value between the output signals from the black insertion shift register SR_K1, SR_K480 and a high signal H.

When the input signal is a high signal H, the first gate circuit G and second gate circuit DG output a voltage Vgon which sets the pixel switch SW in the ON state (i.e. renders the source-drain path conductive). When the input signal is a low signal L, the first gate circuit G and second gate circuit DG output a voltage Vgoff which sets the pixel switch SW in the OFF state (i.e. renders the source-drain path non-conductive).

The signal line driving circuit SD is controlled by the controller CTRL and supplies video signals or reverse transition prevention signals as source signals S (S1 to S1920) to the signal lines SL at a predetermined timing. In addition, the signal line driving circuit SD is controlled by the controller CTRL and supplies reverse transition prevention signals to the dummy signal lines DSL1 and DSL2 at a predetermined timing.

Besides, a counter-electrode (not shown) is disposed on the counter-substrate so as to be opposed to the plural pixel electrodes. A pair of alignment films (not shown) are disposed on the plural pixel electrodes and the counter-electrode. The pair of alignment films are subjected to rubbing treatment in a predetermined direction, thereby to control the alignment state of liquid crystal molecules of the liquid crystal layer LQ. The major axes of the liquid crystal molecules are aligned substantially in accordance with the rubbing direction of the alignment films. In the present embodiment, the rubbing treatment is performed in a direction D1 shown in FIG. 1.

Next, the operation of the above-described liquid crystal display device is described with reference to the accompanying drawings. In the liquid crystal display device according to the present embodiment, a column reversal driving scheme is executed as a driving method of the liquid crystal display device. Black insertion driving for preventing reverse transition is executed in a first half of one frame period, and video signal write is executed in a second half of one frame period.

Figure 3:
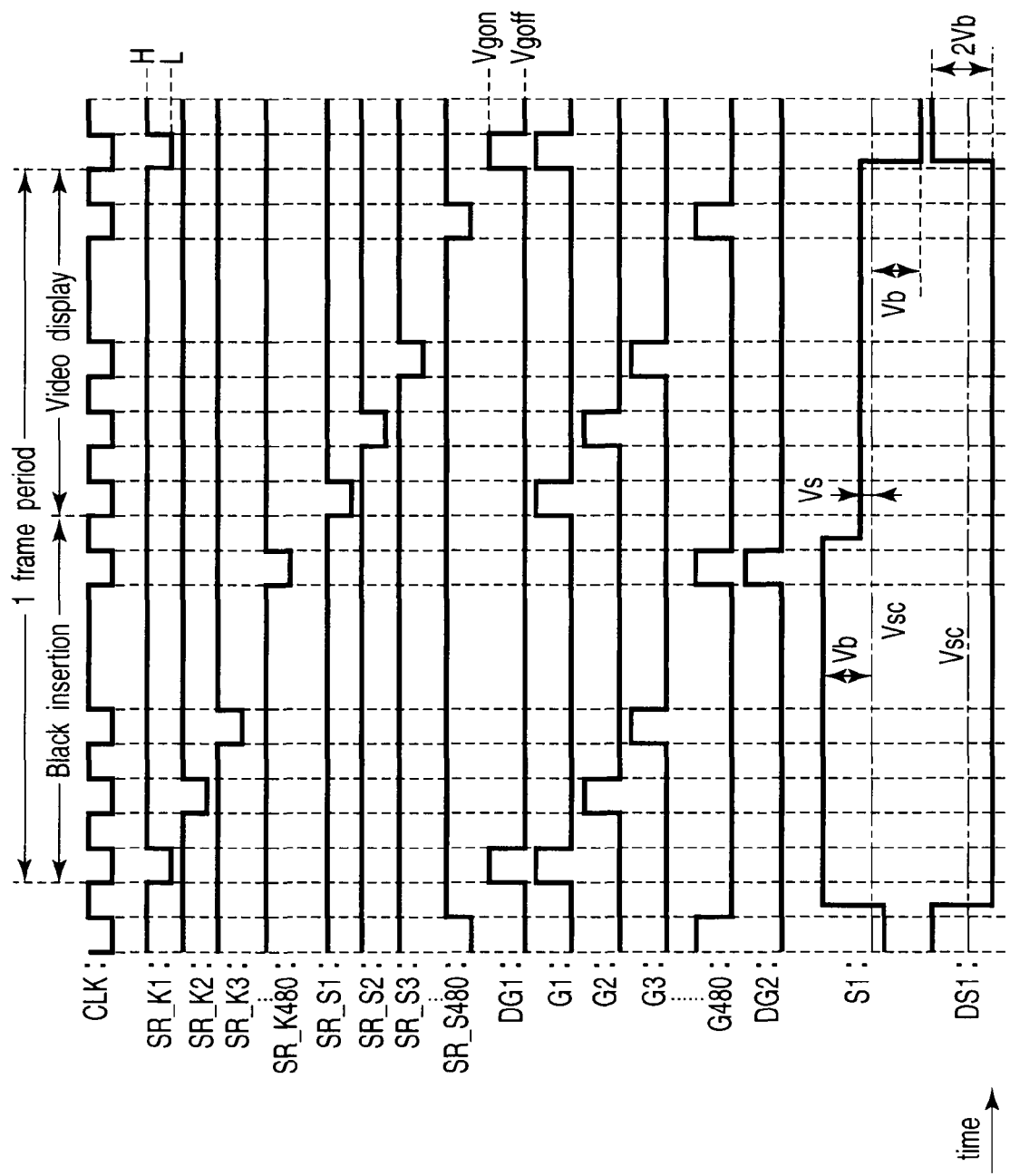
FIG. 3 is a timing chart for explaining an example of a driving method of the liquid crystal display device shown in FIG. 1 and FIG. 2.

Specifically, as shown in FIG. 3, in the first half of one frame period, the black insertion shift register SR_K of the scanning line driving circuit GD successively outputs a high signal H to the first gate circuit G and second gate circuit DG in sync with the clock signal CLK. The first gate circuit G and second gate circuit DG output an ON voltage Vgon to the scanning line GL and dummy scanning line DGL at a timing when the high signal H is input to the input terminal thereof.

The signal line driving circuit SD applies a voltage Vb, which corresponds to black display, as a reverse transition prevention voltage to the signal line SL and dummy signal line DSL in the first half of one frame period. Accordingly, in this period, the voltage Vb is written in the pixel electrode PE via the pixel switch SW, the source-drain path of which is rendered conductive by the ON voltage Vgon that is applied to the scanning line GL or dummy scanning line DGL.

In the second half of one frame period, the video signal shift registers SR_S of the scanning line driving circuit GD successively output high signals H to the first gate circuits G in sync with the clock signal CLK. The first gate circuit G outputs the ON voltage Vgon to the scanning line GL at a timing when the high signal H is input to the input terminal thereof.

In the second half of one frame period, the signal line driving circuit SD applies video signals Vs to the signal lines SL. Accordingly, in this period, the voltage Vs is written in the pixel electrode PE via the pixel switch SW, the source-drain path of which is rendered conductive by the ON voltage Vgon that is applied to the scanning line GL.

In the case of the liquid crystal display device according to the present embodiment, as shown in FIG. 3, in the first half of each frame period, the dummy scanning line DGL1 is driven at the same time as the timing of driving of the scanning line GL1. The dummy scanning line DGL2 is driven at the same time as the timing of driving of the scanning line GL480.

Specifically, as shown in FIG. 2, the output of the black insertion shift register SR_K1 is input to the first gate circuit G1 and second gate circuit DG1, and the output of the black insertion shift register SR_K480 is input to the first gate circuit G480 and second gate circuit DG2.

Accordingly, the second gate circuit DG1 and first gate circuit G1 output the voltage Vgon at the same time, and the second gate circuit DG2 and first gate circuit G480 output the voltage Vgon at the same time. Thus, in the liquid crystal display device according to the present embodiment, in the same period as the period in which the 480 scanning lines GL are scanned, the voltage Vb corresponding to black display can be charged in all the display pixels PX and DPX including the dummy display pixels DPX.

In the second half of each frame period, the video signal Vs is written in the display pixels PX. The output signals of the video signal shift registers SR (SR_S1 to SR_S1920) successively become low signals L in sync with the clock signal CLK, and the scanning lines GL1 to GL480 are successively driven.

In this period, however, since the outputs of the black insertion shift register SR_K1 and black insertion shift register SR_K480 are always high signals H, the second gate circuit DG1 and second gate circuit DG2 always output the OFF signal Vgoff. Accordingly, in this period, the voltage Vb corresponding to black display is retained in the dummy display pixels DPX which are connected to the second gate circuit DG1 and second gate circuit DG2.

As has been described above, in the case where the black insertion driving scheme is applied to the liquid crystal display device, different signals are alternately applied to the display pixels PX in one frame period on the basis of the video signal Vs and the reverse transition prevention signal (signal corresponding to black display) Vb.

In short, at the timing when an image is displayed, the liquid crystal molecules can be set in an alignment state between white display and black display on the basis of the video signal Vs. On the other hand, at the timing of black insertion, the liquid crystal molecules can be set in an alignment state similar to the state of black display on the basis of the reverse transition prevention signal.

As has been described above, the alignment state of liquid crystal molecules varies and becomes different between when the video signal is applied to the liquid crystal layer LQ and when the reverse transition prevention signal is applied to the liquid crystal layer LQ. With the repeated variation of the alignment state of the liquid crystal molecules, a flow occurs in the liquid crystal layer LQ in the rubbing direction D1.

In the case where impurities, which are included in, for example, glass substrates, are present as ions in the liquid crystal layer LQ, the ions move in the rubbing direction D1 in accordance with the flow occurring in the liquid crystal layer LQ.

Figure 4:
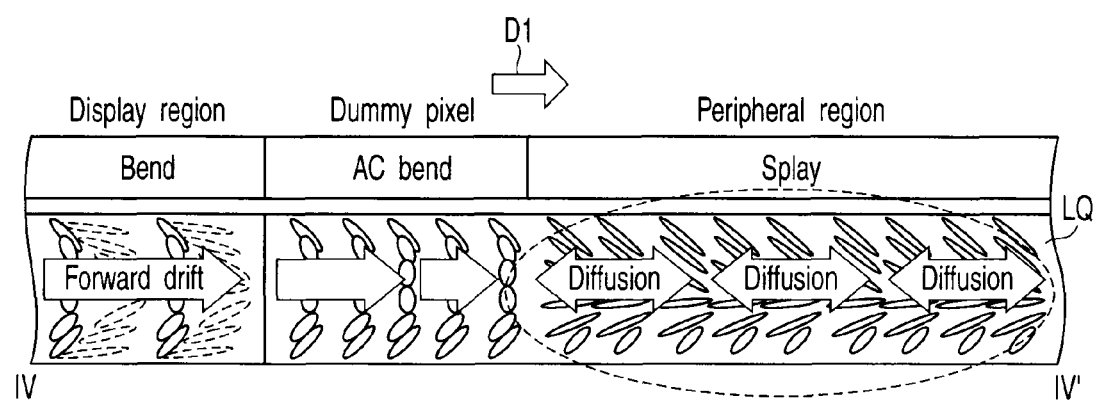
FIG. 4 is a cross-sectional view taken along line IV-IV' in FIG. 1, schematically showing an example of the cross section of the liquid crystal display panel shown in FIG. 1.

In the case of the liquid crystal display device according to the present embodiment, the liquid crystal display device is driven in the manner as described above. Thereby, as shown in FIG. 4 which illustrates an example of the cross section of the liquid crystal layer along line IV-IV' in FIG. 1, the ions, which have moved to the terminal end side in the rubbing direction D1 of the display section DYP, can be further moved to the splay alignment region which is disposed on the outside of the display section DYP.

Specifically, as described above, the reverse transition prevention voltage is cyclically applied to the dummy display pixels DPX which are disposed around the display section DYP and, as a result, a flow occurs from the display section DYP toward the splay region via the dummy display pixels DPX. Thereby, the ions, which concentrate at the terminal end side in the rubbing direction D1 of the display section DYP, can be moved toward the splay region.

In addition, since the flow of the liquid crystal from the display section DYP toward the outside occurs around the display section DYP by driving the dummy display pixels PX as described above, it is possible to prevent the ions from moving from the splay region toward the display section DYP due to diffusion.

Therefore, the present embodiment can provide an OCB mode liquid crystal display device which can suppress display non-uniformity due to agglomeration of ions, and has high display quality and high reliability.

In the meantime, it should suffice if the voltage Vb is applied as the reverse transition prevention voltage, at least once in one frame, to the display pixels which are connected to the dummy signal line DSL1, and it is desirable to execute black display even in the period of video display. Thus, it is desirable to execute driving as shown in FIG. 3.

Next, a liquid crystal display device according to a second embodiment of the present invention is described with reference to the accompanying drawings. In the description below, the structural parts common to those in the liquid crystal display device of the above-described first embodiment are denoted by like reference numerals, and a description thereof is omitted.

Figure 5:
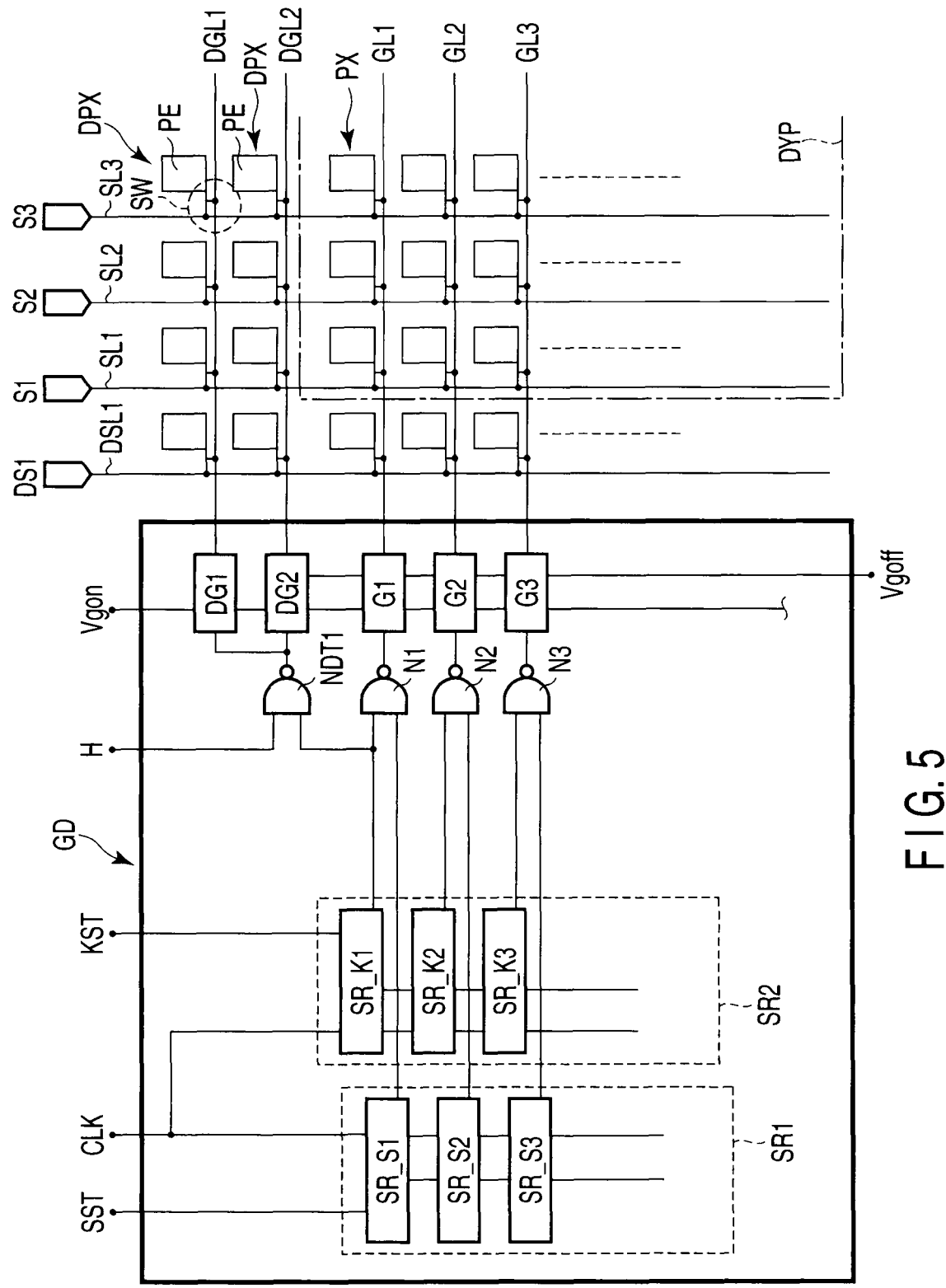
FIG. 5 schematically shows an example of the structure of a liquid crystal display panel and a driving unit of a liquid crystal display device according to a second embodiment of the present invention.

As shown in FIG. 5, in the liquid crystal display device of the present embodiment, a plurality of rows of dummy display pixels DPX are disposed. In the case shown in FIG. 5, two rows of dummy display pixels DPX are disposed. In the display section DYP, dummy scanning lines DGL1 and DGL2, which extend substantially in parallel to the scanning lines SL, are disposed along the rows in which the dummy display pixels DPX are arranged.

In the scanning line driving circuit GD, as shown in FIG. 5, the output signal from the second NAND circuit NDT1 is supplied to two second gate circuits DG1 and DG2. Accordingly, as shown in FIG. 6, in the first half of each frame period, the dummy scanning lines DGL1 and DGL2 are driven at the same time as the timing of driving of the scanning line GL1.

If the plural rows of dummy display pixels DPX are disposed as described above, the same advantageous effects as with the liquid crystal display device according to the above-described first embodiment can be obtained. Further, the movement of ions from the splay region toward the display section DYP due to diffusion can be prevented more effectively.

Figure 7:
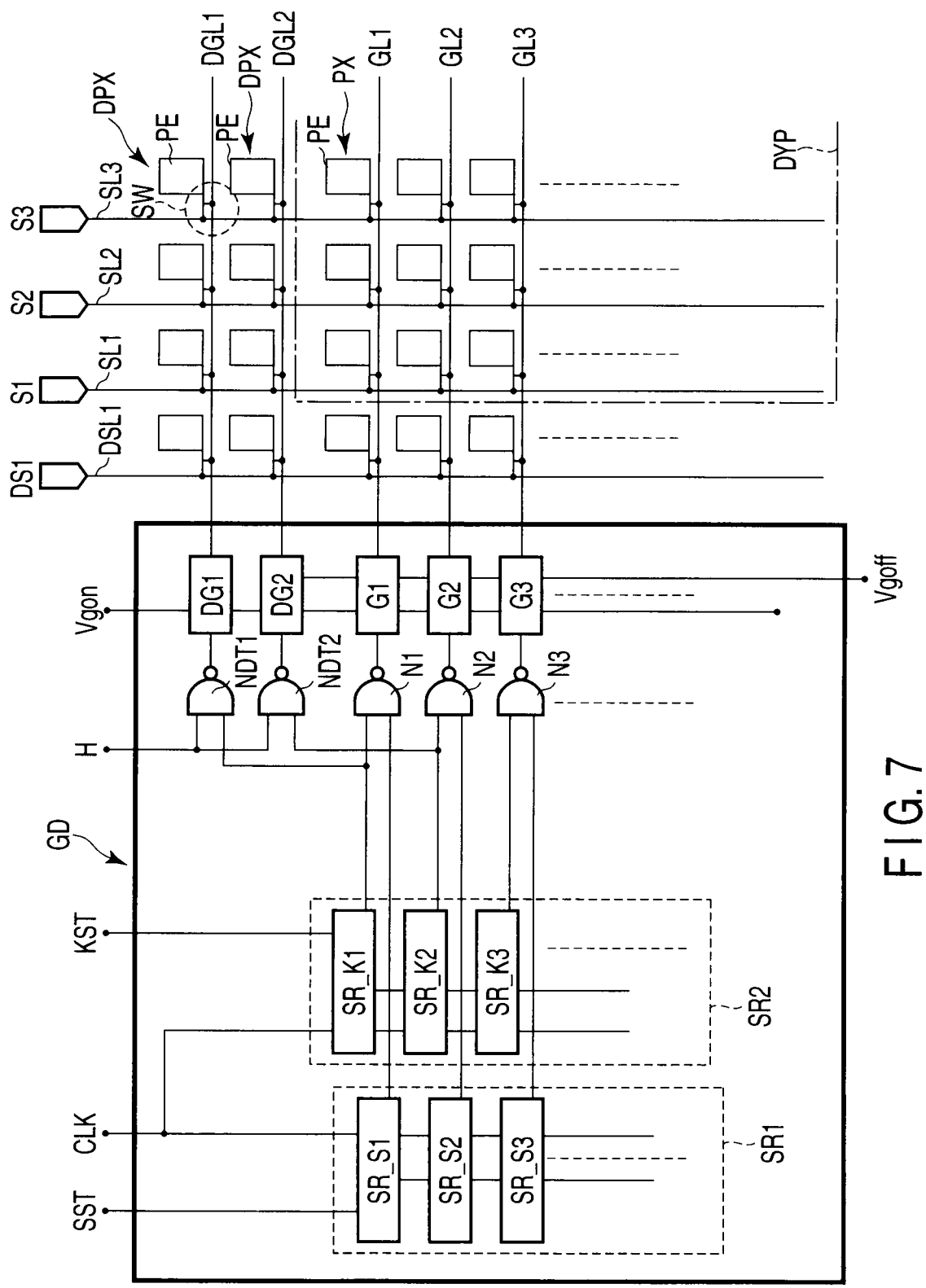
FIG. 7 schematically shows an example of the structure of a liquid crystal display panel and a driving unit of a liquid crystal display device according to a third embodiment of the present invention.

Next, a liquid crystal display device according to a third embodiment of the present invention is described with reference to the accompanying drawings. In the liquid crystal display device according to the present embodiment, like the liquid crystal display device according to the above-described second embodiment, a plurality of rows of dummy display pixels DPX are disposed. In the case shown in FIG. 7, two rows of dummy display pixels DPX are disposed. In the display section DYP, dummy scanning lines DGL1 and DGL2, which extend substantially in parallel to the scanning lines SL, are disposed along the rows in which the dummy display pixels DPX are arranged.

The gate driver GD of the liquid crystal display device according to the present embodiment includes a second NAND circuit NDT1 which supplies an output signal to the second gate circuit DG1, and a second NAND circuit NDT2 which supplies an output signal to the second gate circuit DG2.

An output from the black insertion shift register SR_K1 is supplied to the second NAND circuit NDT1. An output from the black insertion shift register SR_K2 is supplied to the second NAND circuit NDT2.

Figure 8:
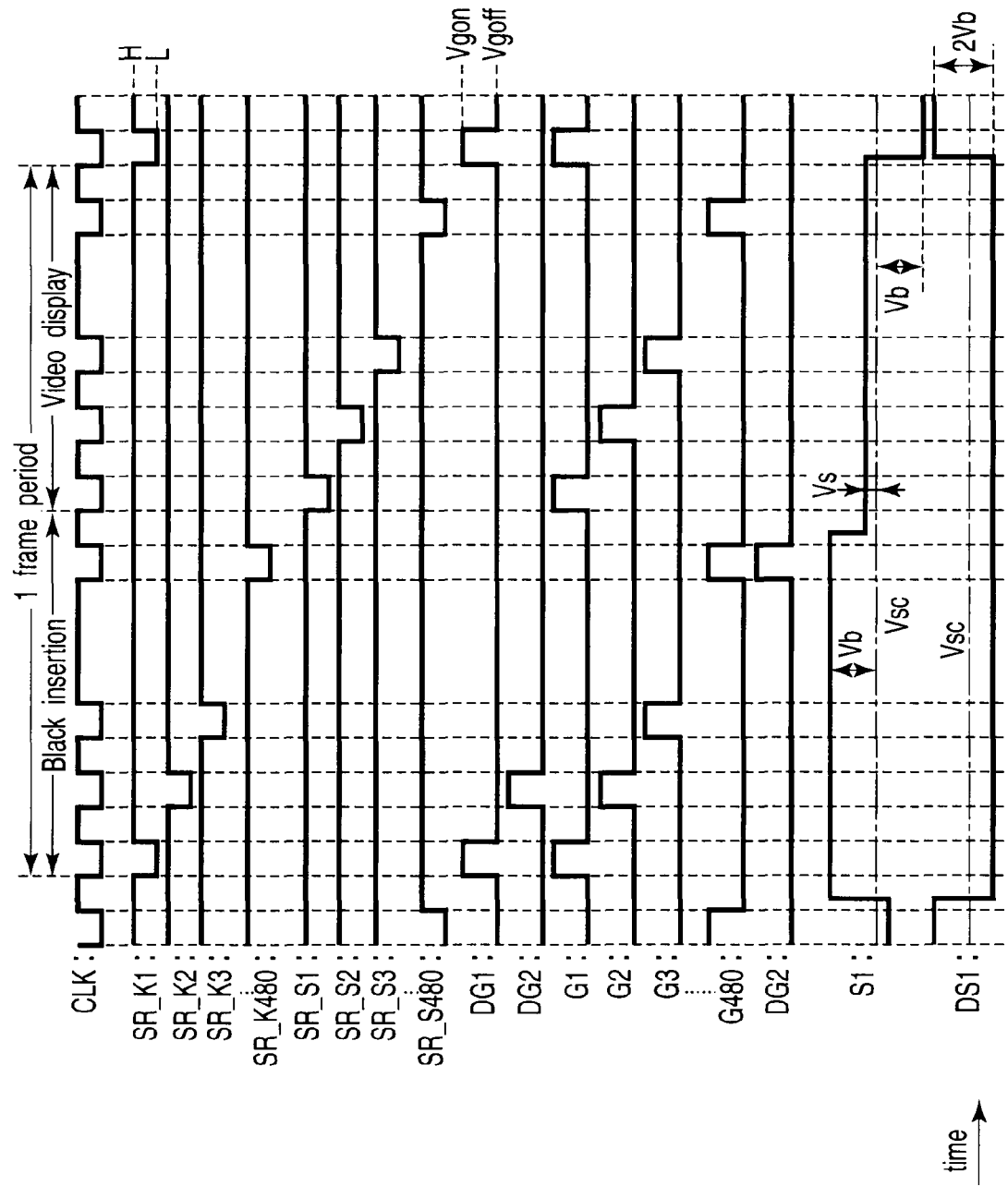
FIG. 8 is a timing chart for explaining an example of a driving method of the liquid crystal display device shown in FIG. 7.

Accordingly, as shown in FIG. 8, in the first half of each frame, the dummy scanning line DGL1 is driven at the same time as the timing of driving of the scanning line GL1. In the first half of each frame, the dummy scanning line DGL2 is driven at the same time as the timing of driving of the scanning line GL2.

If the plural rows of dummy display pixels DPX are disposed as described above, the same advantageous effects as with the liquid crystal display device according to the above-described first embodiment can be obtained. Further, the movement of ions from the splay region toward the display section DYP due to diffusion can be prevented more effectively.

Figure 10:
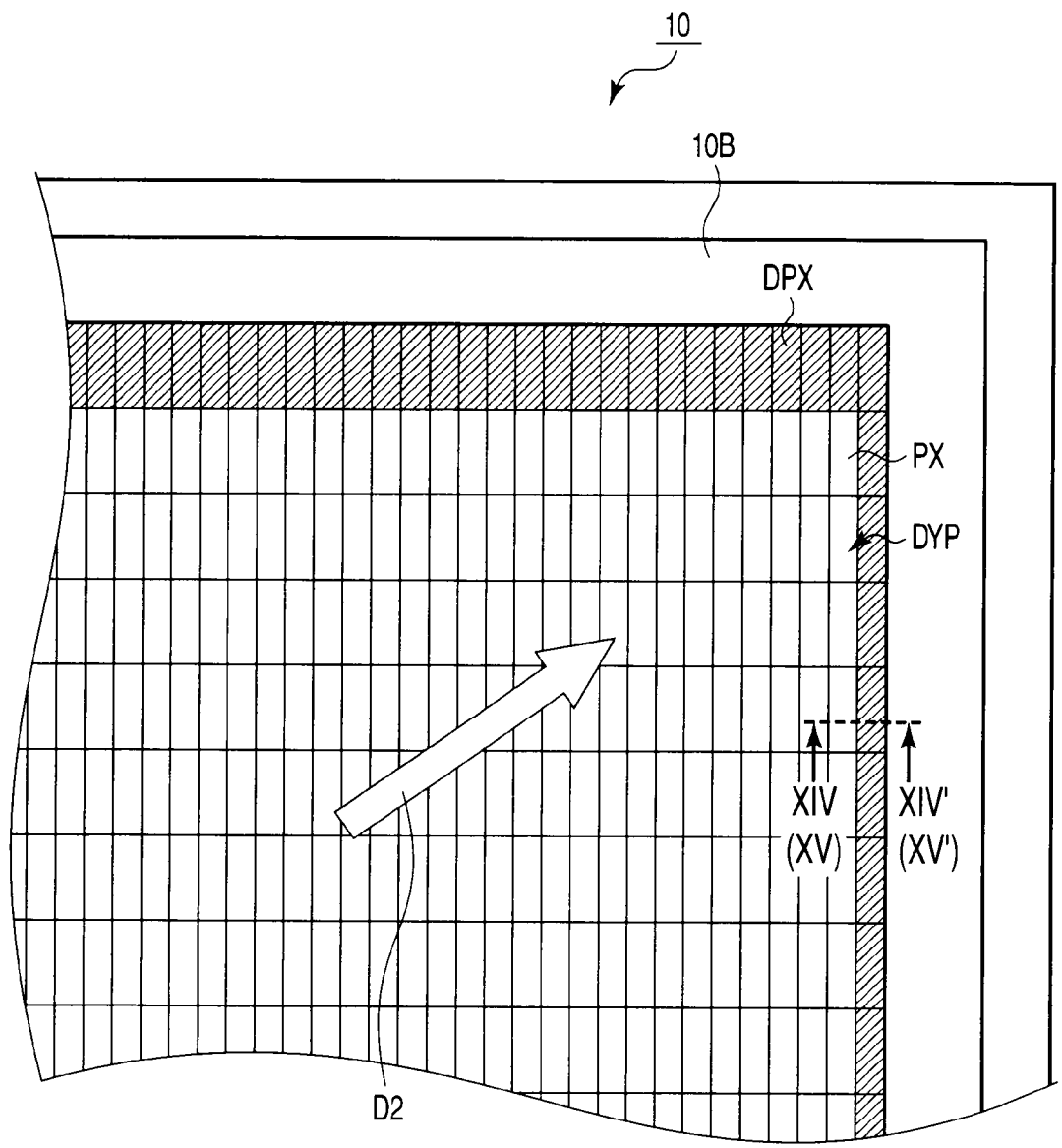
FIG. 10 is a view for explaining an example of the structure of a region in the vicinity of a boundary between a display section and a peripheral section of the liquid crystal display panel shown in FIG. 1.

Next, a liquid crystal display device according to a fourth embodiment of the present invention is described with reference to the accompanying drawings. As shown in FIG. 1 and FIG. 10, a liquid crystal display panel 10 of the liquid crystal display device according to the present embodiment has a substantially rectangular shape, and includes a display section DYP which is composed of a plurality of display pixels PX arrayed in a matrix, and a peripheral section 10B surrounding the periphery of the display section DYP. In a color-display-type liquid crystal display device, various kinds of display pixels, such as a red display pixel, a green display pixel and a blue display pixel, are disposed as the display pixels PX in the display section DYP.

An array substrate 12 includes a plurality of pixel electrodes PE which are disposed substantially in a matrix in association with the display pixels PX. A counter-substrate 14 includes a counter-electrode CE which is opposed to the plural pixel electrodes PE.

A pair of alignment films (not shown) for aligning the liquid crystal are disposed on the plural pixel electrodes PE and the counter-electrode CE. The alignment state of the liquid crystal is obtained by controlling the orientation of liquid crystal molecules on the pair of alignment films. The pair of alignment films are subjected to rubbing treatment in a predetermined direction, thereby to control the alignment state of liquid crystal molecules included in the liquid crystal layer LQ.

The major axes of the liquid crystal molecules included in the liquid crystal layer LQ are aligned substantially in accordance with the rubbing direction of the alignment films. In the liquid crystal display device according to the present embodiment, the alignment films on the array substrate 12 and counter-substrate 14 are subjected to rubbing treatment in substantially parallel directions D2 shown in FIG. 10.

As shown in FIG. 1 and FIG. 10, in the peripheral section 10B, dummy display pixels DPX are disposed at least along the display section DYP on the terminal end side of the rubbing direction D2. In the liquid crystal display device according to the present embodiment, the dummy display pixels DPX are disposed so as to surround the display section DYP.

The liquid crystal display device further includes a driving unit which drives the display pixels PX and dummy display pixels DPX, and a controller CTRL which controls the driving unit. The driving unit includes a scanning line driving circuit GD and a signal line driving circuit SD.

In the display section DYP, scanning lines GL extending along rows in which display pixels PX are arranged and signal lines SL extending along columns in which display pixels PX are arranged are disposed on the array substrate 12.

The liquid crystal display device according to the present embodiment is, for example, a VGA (video graphics array) (640×3 pixels in the horizontal direction, 480 pixels in the vertical direction) display device, and 480 scanning lines (GL1 to GL480) and 1920 signal lines (SL1 to SL1920) are disposed on the display section DYP. Further, in the peripheral section 10B, dummy scanning lines DGL extending substantially in parallel to the scanning lines GL and dummy signal lines DSL extending substantially in parallel to the signal lines SL are disposed at positions corresponding to the parts where the dummy display pixels DPX are disposed.

Specifically, in the liquid crystal display device according to the present embodiment, a row of dummy display pixels DPX is disposed on each of an upper side and a lower side of the display section DYP, and a column of dummy display pixels DPX is disposed on each of a left side and a right side of the display section DYP. Accordingly, a dummy scanning line DGL1 extending substantially in parallel to the scanning lines GL is disposed on the upper side of the display section DYP, and a dummy scanning line DGL2 extending substantially in parallel to the scanning lines GL is disposed on the lower side of the display section DYP. A dummy signal line DSL1 extending substantially in parallel to the signal lines SL is disposed on the left side of the display section DYP, and a dummy signal line DSL2 extending substantially in parallel to the signal lines SL is disposed on the right side of the display section DYP.

As shown in FIG. 9, pixel switches SW are disposed near intersections between the scanning lines GL or dummy scanning lines DGL and the signal lines SL or dummy signal lines DSL. Each of the pixel switches SW includes, for example, a thin-film transistor (TFT) as a switching element.

A gate electrode of the pixel switch SW is electrically connected to the associated scanning line GL or dummy scanning line DGL. A source electrode of the pixel switch SW is electrically connected to the associated signal line SL or dummy signal line DSL. A drain electrode of the pixel switch SW is electrically connected to a pixel electrode PE which is disposed in each of the display pixels PX or dummy display pixels DPX.

The scanning lines GL and dummy scanning lines DGL1 and DGL2 are electrically connected to the scanning line driving circuit GD. The signal lines SL and dummy signal lines DSL1 and DSL2 are electrically connected to the signal line driving circuit SD.

The scanning line driving circuit GD and the signal line driving circuit SD are controlled by the controller CTRL, and cyclically apply a video signal and a reverse transition prevention signal to the liquid crystal layer LQ in the display pixels PX and cyclically apply a reverse transition prevention signal to the liquid crystal layer LQ in the dummy display pixels DPX. In the liquid crystal display device according to the present embodiment, a voltage Vb corresponding to black display is applied as the reverse transition prevention signal to the display pixels PX and dummy display pixels DPX.

Specifically, the scanning lines GL are successively selected by the scanning line driving circuit GD, and signals that are output from the signal line driving circuit SD are applied to the pixel electrodes PE via the pixel switches SW which are connected to the selected scanning line GL. A counter-voltage is applied to the counter-electrode CE by a counter-electrode driving unit (not shown).

In the liquid crystal display device according to the present embodiment, a reverse transition prevention signal is cyclically applied to the liquid crystal layer in order to prevent reverse transition of liquid crystal molecules. The liquid crystal display device according to the present embodiment adopts the black insertion driving scheme in which a black display signal Vb corresponding to black display is applied as the reverse transition prevention signal. In the case where the black insertion driving scheme is applied to the liquid crystal display device, images are alternately displayed in one frame on the basis of the video signal and the reverse transition prevention signal. Thereby, the reverse transition of the liquid crystal molecules is prevented and the display quality can be improved.

Figure 11:
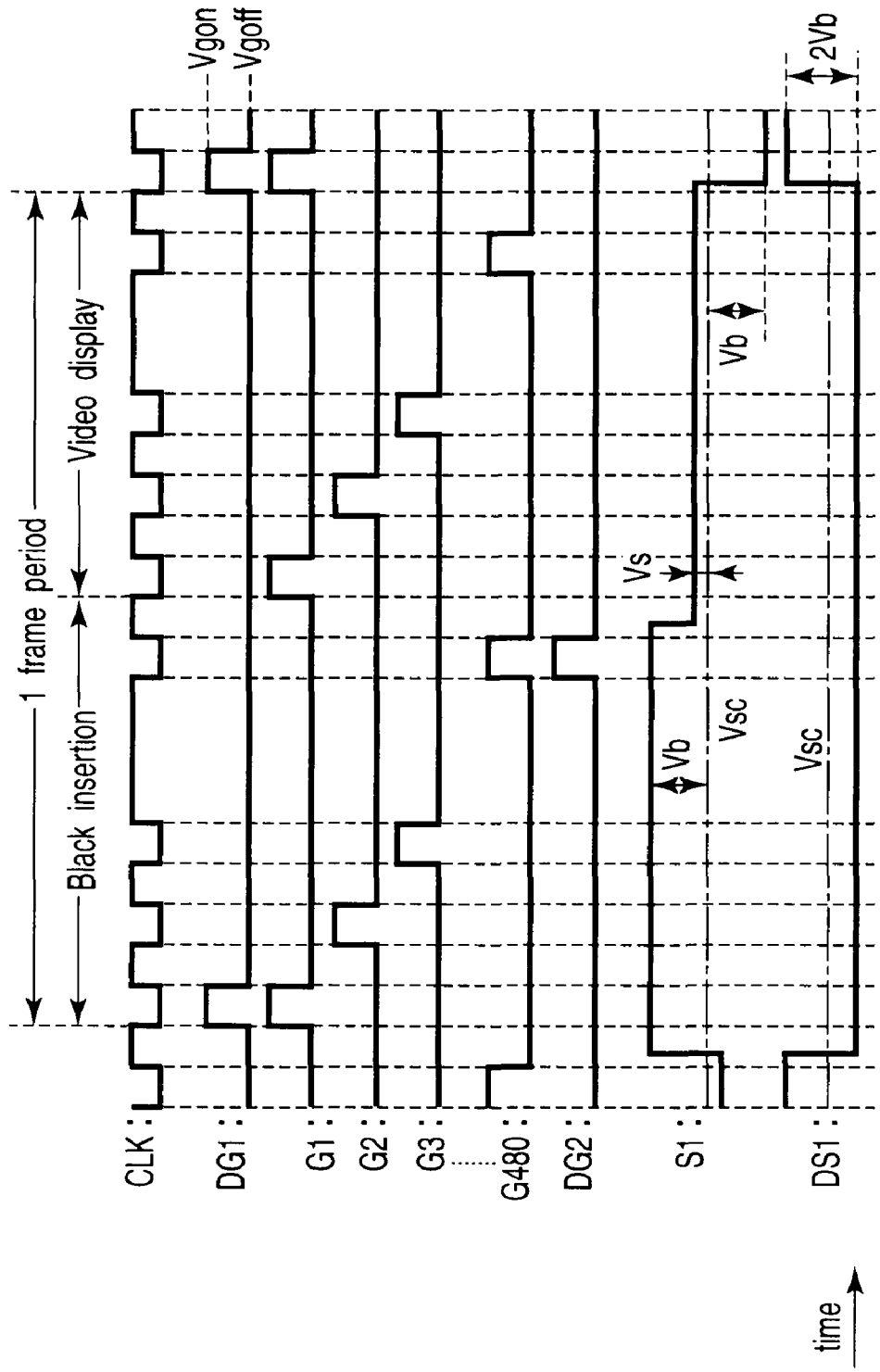
FIG. 11 is a view for explaining another example of the driving method of the liquid crystal display device shown in FIG. 1.

Specifically, as shown in FIG. 11, in each of the black insertion period and video display period of one frame period, the scanning line driving circuit GD successively drives the scanning lines GL. The signal line driving circuit SD applies the signal Vb corresponding to black display to the signal lines SL in the black insertion period, and applies the video signals Vs corresponding to the signal lines SL in the video display period.

In the liquid crystal display device according to the present embodiment, the voltage corresponding to black display is applied to the pixel electrodes PE of the dummy display pixels DPX through the one frame period. Specifically, as shown in FIG. 11, the scanning line driving circuit GD scans the scanning line GL1 and dummy scanning line DGL1 at the same time and scans the scanning line GL480 and dummy scanning line DGL2 at the same time in each of the black insertion period and video display period of one frame period. The signal line driving circuit SD applies the signal Vb corresponding to black display to the dummy signal lines DSL1 and DSL2 through the one frame period.

In short, at the timing when an image is displayed, the liquid crystal molecules can be set in an alignment state between white display and black display on the basis of the video signal Vs that is applied to the pixel electrodes PE. On the other hand, at the timing of black insertion, the liquid crystal molecules can be set in an alignment state similar to the state of black display on the basis of the reverse transition prevention signal that is cyclically applied to the pixel electrodes PE.

Figure 12:
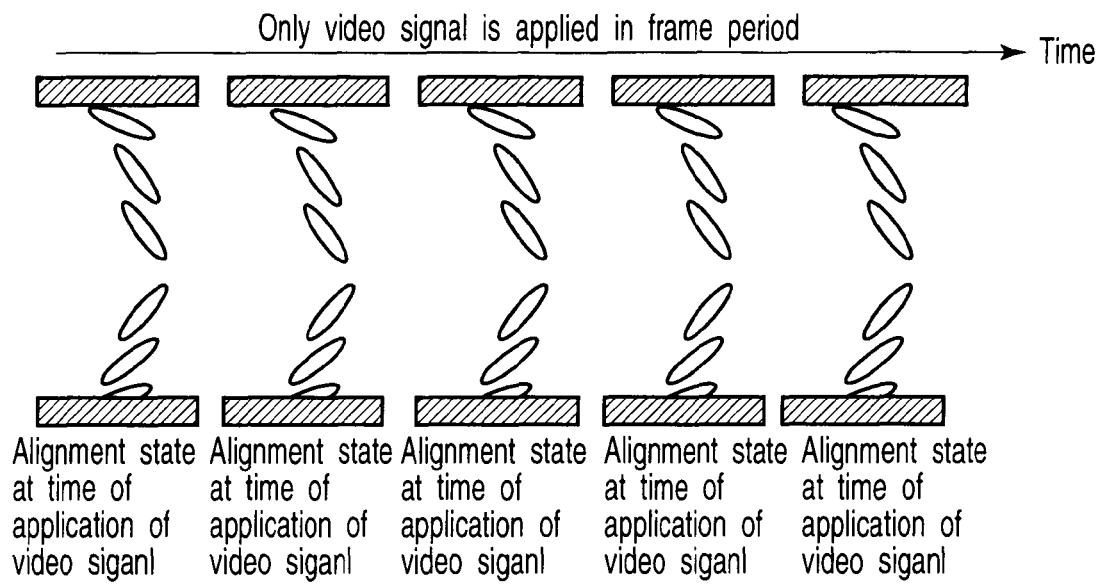
FIG. 12 is a view for explaining an example of the alignment state of liquid crystal molecules in a case where only a video signal is applied to the liquid crystal layer in one frame period.

As shown in FIG. 12, in the case where only the video signal Vs is applied to the pixel electrodes PE through the frame period, the alignment state of liquid crystal molecules is an alignment state between black display and white display through the frame period, and the variation of the alignment state of liquid crystal molecules is small.

Figure 13:
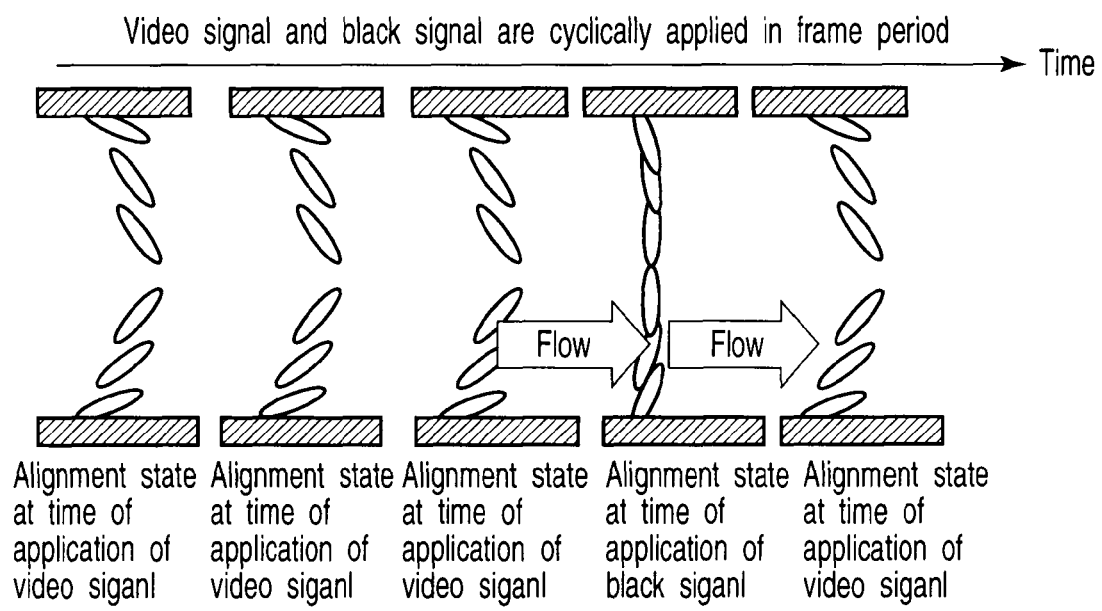
FIG. 13 is a view for explaining an example of the alignment state of liquid crystal molecules in a case where a video signal and a reverse transition prevention signal are cyclically applied to the liquid crystal layer in one frame period.

By contrast, as shown in FIG. 13, in the case where the video signal Vs and the signal Vb corresponding to black display are cyclically applied in the frame period, the alignment state of liquid crystal molecules varies greatly, compared to the case shown in FIG. 12, between when the video signal Vs is applied to the pixel electrode PE and when the signal Vb corresponding to black display is applied.

With the repeated variation of the alignment state of the liquid crystal molecules, a flow occurs in the liquid crystal layer LQ in the rubbing direction D2. Further, if impurities, which are included in, for example, glass substrates, are present as ions in the liquid crystal layer LQ, the ions move in the rubbing direction D2 in accordance with the flow occurring in the liquid crystal layer LQ.

The ions, which move in accordance with the flow of the liquid crystal layer LQ, move to the vicinity of the boundary between the display section DYP and the peripheral section 10B. In the liquid crystal display device according to the present embodiment, the voltage corresponding to black display is applied to the liquid crystal layer LQ in the dummy display pixels DPX.

In this case, since the dummy display pixels DPX are disposed on the peripheral section 10B, the flow of the liquid crystal layer LQ does not stop at the vicinity of the boundary between the display section DYP and the peripheral section 10B, and a continuous flow occurs from the display section DYP toward the peripheral section 10B in the liquid crystal layer LQ. Accordingly, as shown in FIG. 14, the ions that are present in the liquid crystal layer LQ move to the peripheral section 10B through the boundary between the display section DYP and the peripheral section 10B.

Figure 14:
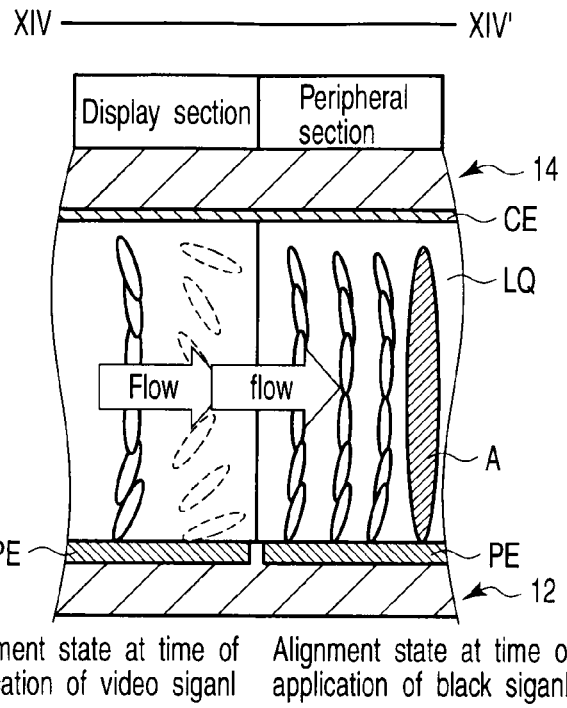
FIG. 14 is a cross-sectional view taken along line XIV-XIV' in FIG. 10, showing an example of the cross section of the liquid crystal display panel shown in FIG. 10.

Specifically, according to the above-described liquid crystal display device, as shown in FIG. 14, a part A, where ions agglomerate, occurs in the peripheral section 10B, and no agglomeration of ions occurs in the liquid crystal layer LQ in the display section DYP. Thus, ions in the liquid crystal layer LQ do not become non-uniform in the display section DYP.

Therefore, the present embodiment can provide a liquid crystal display device which can suppress a display defect, such as display non-uniformity, due to non-uniformity of ions in the liquid crystal layer, and has high display quality and high reliability.

Next, a liquid crystal display device according to a fifth embodiment of the present invention is described with reference to the accompanying drawings. In the description below, the structural parts common to those in the liquid crystal display device of the above-described first embodiment are denoted by like reference numerals, and a description thereof is omitted.

In the liquid crystal display device of the present embodiment, like the liquid crystal display device of the fourth embodiment, dummy display pixels DPX are disposed at least along the display section DYP on the terminal end side of the rubbing direction D2. In the case of the liquid crystal display device according to the present embodiment, the dummy display pixels DPX are disposed so as to surround the display section DYP.

Figure 15:
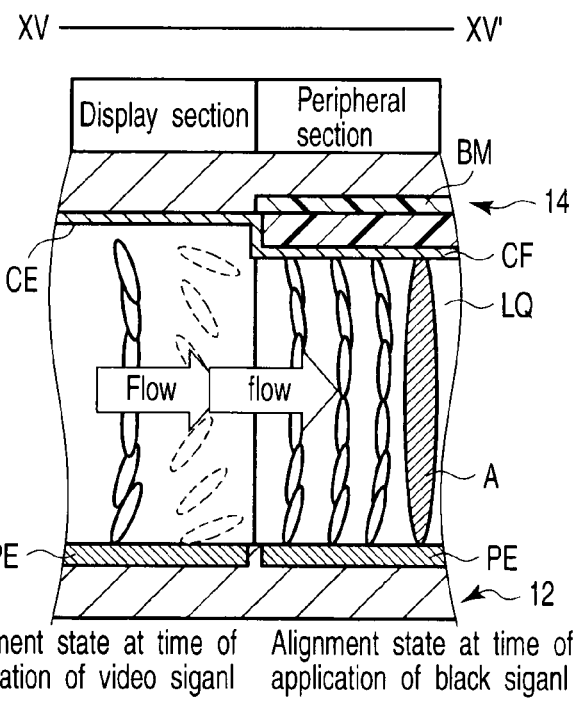
FIG. 15 is a cross-sectional view taken along line XV-XV' in FIG. 10, showing another example of the cross section of the liquid crystal display panel shown in FIG. 10.

Further, as shown in FIG. 15, the thickness of the liquid crystal layer LQ in the dummy display pixel DPX is less than the thickness of the liquid crystal layer LQ in the display pixel PX. In the liquid crystal display device of the present embodiment, the counter-substrate 14 has a projection portion at a position corresponding to the dummy display pixel DPX. For example, as shown in FIG. 15, the projection portion is provided by disposing a color filter layer CF under the counter-electrode CE at a position corresponding to the dummy display pixel DPX of the counter-substrate 14. The thickness of the liquid crystal layer LQ in the dummy display pixel DPX is decreased by the color filter layer CF.

As has been described above, the thickness of the liquid crystal layer LQ in the dummy display pixel DPX is made less than the thickness of the liquid crystal layer LQ in the display pixel PX. Thereby, the speed of the flow of the liquid crystal layer LQ from the display section DYP toward the peripheral section 10B increases in the vicinity of the boundary between the display section DYP and the peripheral section 10B. Accordingly, the ions, which have moved to the vicinity of the boundary between the display section DYP and the peripheral section 10B by the flow occurring in the liquid crystal layer LQ, quickly move from the display section DYP to the peripheral section 10B.

Specifically, according to the liquid crystal display device of the present embodiment, the ions in the liquid crystal layer LQ in the display section DYP quickly move to the peripheral section 10B and, as shown in FIG. 15, a part A, where ions agglomerate, occurs in the peripheral section 10B. As a result, no agglomeration of ions occurs in the display section DYP, and it is possible to more effectively suppress non-uniformity of ions in the liquid crystal layer LQ in the display section DYP.

Therefore, the present embodiment can provide a liquid crystal display device which can suppress a display defect, such as display non-uniformity, due to non-uniformity of ions in the liquid crystal layer, and has high display quality and high reliability.

The present invention is not limited directly to the above-described embodiments. In practice, the structural elements can be modified and embodied without departing from the spirit of the invention. For example, in the liquid crystal display devices according to the above-described embodiments, the dummy display pixels DPX are disposed so as to surround the display section. However, it should suffice if the dummy display pixels DPX are disposed at least on the terminal end side of the display section DYP in the rubbing direction D1.

Two or more rows or two or more columns of dummy display pixels DPX may be disposed continuously around the display section DYP. Even in this case, the same advantageous effects as with the above-described embodiments can be obtained.

For example, the liquid crystal display devices according to the above-described first to fifth embodiments are OCB mode liquid crystal display devices, but the present invention is also applicable to other types of liquid crystal display devices which adopt driving methods in which predetermined signals are cyclically applied as in the black insertion driving scheme. Thereby, the same advantageous effects as with the liquid crystal display devices of the above-described embodiments can be obtained. For example, the present invention is also applicable to TN mode, VA mode and IPS mode liquid crystal display devices.

For example, in the case where the present invention is applied to a TN mode liquid crystal display device, dummy display pixels are disposed at least in a direction of the sum of the vector of the direction in which the array-substrate-side alignment film is rubbed and the vector of the direction in which the counter-substrate-side alignment film is rubbed. Thereby, the same advantageous effects as in the present invention can be obtained.

In the liquid crystal display device according to the above-described fifth embodiment, the color filter layer CF is disposed on the counter-substrate side, and thereby the thickness of the liquid crystal layer LQ in the dummy display pixel DPX is made less than the thickness of the liquid crystal layer LQ in the display pixel PX. Alternatively, for example, an insulation layer may be disposed on the array substrate 12 side, or insulation layers may be disposed both on the array substrate 12 side and on the counter-substrate 14 side. Besides, a recess portion may be provided in the array substrate 12 or the counter-substrate 14 in the display section DYP. Even in this case, the same advantageous effects as with the liquid crystal display devices according to the first and second embodiments can be obtained.

Various inventions can be made by properly combining the structural elements disclosed in the embodiments. For example, some structural elements may be omitted from all the structural elements disclosed in the embodiments. Furthermore, structural elements in different embodiments may properly be combined.

What is claimed is:

1. A liquid crystal display device comprising:
   a liquid crystal display panel including a first substrate and a second substrate which are opposed to each other, a liquid crystal layer which is held between the first substrate and the second substrate, and a display section which is composed of a plurality of display pixels arrayed in a matrix;
   a driving unit which drives the display pixels; and
   a control unit which controls the driving unit, the liquid crystal display device further comprising:
   pixel electrodes which are disposed on the first substrate in association with the plurality of display pixels;
   a counter-electrode which is disposed on the second substrate in such a manner that the counter-electrode is opposed to the plurality of pixel electrodes; and
   a pair of alignment films which are disposed on the plurality of pixel electrodes and the counter-electrode, and control an alignment state of liquid crystal molecules, which are included in the liquid crystal layer, by rubbing treatment,
   wherein the liquid crystal display panel includes dummy display pixels which are disposed at least on a terminal end side of the display section in a rubbing direction of the alignment films, and
   the driving unit includes means for cyclically applying a video signal and a reverse transition prevention signal to the display pixels, and cyclically applying the reverse transition prevention signal to the dummy display pixels.

2. The liquid crystal display device according to claim 1, wherein the dummy display pixels are so disposed as to surround the display section.

3. The liquid crystal display device according to claim 1, wherein the display section has a substantially rectangular shape, and
   the dummy display pixels are disposed in a plurality of rows at least along end sides of the display section on the terminal end side of the display section in the rubbing direction.

4. The liquid crystal display device according to claim 1, wherein the driving unit includes means for applying the reverse transition prevention signal to the display pixels and the dummy display pixels in a first half of one frame period, and applying the video signal to the plurality of display pixels in a second half of the one frame period.

5. The liquid crystal display device according to claim 1, wherein the first substrate further includes:
   scanning lines extending along rows in which the plurality of display pixels are disposed;
   signal lines extending along columns in which the plurality of display pixels are disposed;
   dummy scanning lines which are disposed to extend substantially in parallel to the scanning lines in a region where the dummy display pixels are disposed; and
   dummy signal lines which are disposed to extend substantially in parallel to the signal lines in a region where the dummy display pixels are disposed, the driving unit further includes a gate driver to which the scanning lines and the dummy scanning lines are electrically connected and which drives the scanning lines and the dummy scanning lines, and a source driver to which the signal lines and the dummy signal lines are electrically connected and which drives the signal lines and the dummy signal lines, and the gate driver includes means for driving the dummy scanning lines and arbitrary ones of the scanning lines at the same timing.

6. The liquid crystal display device according to claim 5, wherein the gate driver includes:

reverse transition prevention signal applying shift registers;

video signal applying shift registers;

NAND circuits to which output signals from the reverse transition prevention signal applying shift registers and the video signal applying shift registers are supplied;

first gate circuits to which output signals from the NAND circuits are supplied and which supply driving signals to the scanning lines in accordance with the output signals of the NAND circuits; and second gate circuits to which output signals from the NAND circuits are supplied and which supply driving signals to the dummy scanning lines in accordance with the output signals of the NAND circuits, and wherein the NAND circuits include first NAND circuits which supply output signals to the first gate circuits, and second NAND circuits to which the same signals as the output signals of the reverse transition prevention signal applying shift registers, which are input to arbitrary ones of the first NAND circuits, are input, and which supply output signals to the second gate circuits.

7. The liquid crystal display device according to claim 1, wherein the liquid crystal layer includes an OCB mode liquid crystal.

\* \* \* \* \*